(12) United States Patent
Miller et al.

(10) Patent No.: US 11,552,668 B1
(45) Date of Patent: Jan. 10, 2023

(54) MODULAR CUSTOMIZABLE RUGGEDIZED PROTECTIVE CASE FOR MOBILE DEVICE

(71) Applicant: MobileDemand LC, Hiawatha, IA (US)

(72) Inventors: Matthew D. Miller, Cedar Rapids, IA (US); Steven R. Kunert, Cedar Rapids, IA (US)

(73) Assignee: MOBILEDEMAND LC, Hiawatha, IA (US)

( * ) Notice: Subject to any disclaimer, the term of this patent is extended or adjusted under 35 U.S.C. 154(b) by 0 days.

(21) Appl. No.: 17/325,621

(22) Filed: May 20, 2021

Related U.S. Application Data

(60) Division of application No. 16/511,740, filed on Jul. 15, 2019, now Pat. No. 11,031,968, which is a
(Continued)

(51) Int. Cl.
*H04B 1/3888* (2015.01)
*A45C 13/26* (2006.01)
(Continued)

(52) U.S. Cl.
CPC ............ *H04B 1/3888* (2013.01); *A45C 11/00* (2013.01); *A45C 13/26* (2013.01); *G06F 1/1626* (2013.01); *G06F 1/1632* (2013.01); *G06F 1/1656* (2013.01); *H04M 1/0202* (2013.01); *A45C 2011/002* (2013.01)

(58) Field of Classification Search
CPC ........... G06F 1/1626; G06F 2200/1633; G06F 1/1628; G06F 1/1632; G06F 1/1669; G06F 3/0202; G06F 1/1654; G06F 2200/1634; G06F 1/1656; G06F 1/1681; G06F 1/263; G06F 1/16; G06F 1/1616; G06F 1/1633; G06F 1/1643; G06F 1/166; G06F 1/1662; G06F 2200/1632; G06F 2203/04809; A45C 11/00; A45C 2011/003; A45C 2011/002; A45C 2200/15; A45C 13/002; A45C 2011/001; A45C 11/24; A45C 13/005; A45C 13/001; A45C 13/04; A45C 13/30; A45C 15/00; A45C 2001/065; A45C 2200/10; A45C 5/02; H04M 1/185;
(Continued)

(56) References Cited

U.S. PATENT DOCUMENTS 5,933,812 A 8/1999 Meyer et al.
7,249,978 B1 7/2007 Ni
(Continued)

*Primary Examiner* — Golam Sorowar
(74) *Attorney, Agent, or Firm* — Suiter Swantz pc llo

(57) ABSTRACT

A modular ruggedized protective case for a mobile communications device is disclosed. In embodiments, the protective case includes a flexible (e.g., rubberized) primary housing partially enclosing the mobile device and itself partially surrounded or enclosed by a rigid secondary housing. The secondary housing includes port protectors for concealing or shielding connector ports (e.g., USB, HDMI, AC, other like power/data inputs) of the mobile device. The protective case includes an adapter for a type cover keyboard, e.g., capable of partially covering the display surface of the mobile device when closed and serving as a keyboard or other input device when opened; the type cover adapter attached to a connection port and provides for transmission of control input from the type cover to the mobile device when the mobile device is enclosed in the protective case.

7 Claims, 12 Drawing Sheets

Related U.S. Application Data continuation of application No. 16/029,128, filed on Jul. 6, 2018, now Pat. No. 10,355,731, which is a continuation-in-part of application No. 15/422,239, filed on Feb. 1, 2017, now Pat. No. 10,021,237.

(60) Provisional application No. 62/289,822, filed on Feb. 1, 2016.

(51) Int. Cl.
*A45C 11/00* (2006.01)
*G06F 1/16* (2006.01)
*H04M 1/02* (2006.01)

(58) Field of Classification Search
CPC .... H04M 1/0202; H04M 1/04; H04M 1/0214; H04M 1/18; H04M 1/23; H04M 1/72575; H04M 1/0235; H04M 1/0252; H04M 1/0256; H04M 1/026; H04M 1/0279; H04M 1/0283; H04M 1/236; H04M 1/72519; H04M 1/72527
See application file for complete search history.

(56) References Cited

U.S. PATENT DOCUMENTS

| | | |
|---|---|---|
| 9,438,295 B1 | 9/2016 | Song |
| 2005/0085278 A1 | 4/2005 | Lin |
| 2007/0051808 A1 | 3/2007 | Adams et al. |
| 2008/0188270 A1 | 8/2008 | Bjorklund |
| 2010/0262845 A1 | 10/2010 | Goel |
| 2012/0302288 A1 | 11/2012 | Born et al. |
| 2013/0088813 A1* | 4/2013 | Su .................. G06F 1/1628 361/679.01 |
| 2013/0109316 A1* | 5/2013 | Lee .................. G06F 1/1632 455/41.2 |
| 2013/0240380 A1* | 9/2013 | Hansen .................. A45F 5/00 206/37 |
| 2014/0049060 A1 | 2/2014 | Rayner |
| 2014/0152890 A1 | 6/2014 | Rayner |
| 2015/0061477 A1 | 3/2015 | Wilson |
| 2015/0062787 A1 | 3/2015 | Wilson et al. |
| 2015/0201723 A1 | 7/2015 | Rayner et al. |
| 2016/0172883 A1 | 6/2016 | Globerson et al. |
| 2016/0357224 A1* | 12/2016 | Song .................. G06F 1/1628 |
| 2018/0060628 A1 | 3/2018 | Tien |

* cited by examiner

MODULAR CUSTOMIZABLE RUGGEDIZED PROTECTIVE CASE FOR MOBILE DEVICE

CROSS-REFERENCE TO RELATED APPLICATIONS

The Instant Application Claims the Benefit of Priority Under 35 U.S.C. § 121 as a Divisional Application of U.S. patent application Ser. No. 16/511,740 Filed Jul. 15, 2019, which Application Claims the Benefit of Priority Under 35 U.S.C. §§ 119 and/or 120 to:

U.S. patent application Ser. No. 16/029,128 filed Jul. 6, 2018, which claims priority as a continuation-in-part of:

U.S. patent application Ser. No. 15/422,239 filed Feb. 1, 2017, which claims priority to:

U.S. Provisional Patent Application Ser. No. 62/289,822 filed Feb. 1, 2016.

Said U.S. patent application Ser. Nos. 16/511,740; 16/029,128; 15/422,239; and 62/289,822 are herein incorporated by reference in their entirety.

BACKGROUND

Mobile communications devices, such as tablets or smartphones, may be vulnerable to significant vibrations and shocks. In addition, if the mobile device is connected to a network via a cable, port, or other physical link, the sustained vibrations and shocks may dislodge the link from its port or even damage both the link and the port. Further, mobile devices may be augmented by the addition of barcode scanning devices and other types of modular or peripheral input devices, but these devices may not be oriented for optimally convenient use; in other words, the operator of the mobile device must use both hands to support or position the mobile device so that such peripheral input devices may be used and may not be able to simultaneously interface with the peripheral device, e.g., via the mobile device.

Finally, some variants of mobile device may be configured with a type cover, e.g., a flexible cover that provides protection for a touch-sensitive display surface of the mobile device but deploys into a variably positionable keyboard. The type cover may be secured to the mobile device in such a way that it may be easily be removed when not in use. However, when the base mobile device is enclosed in a protective housing or case, the reinforced mobile device may not be compatible with the type cover.

SUMMARY

A modular ruggedized protective case incorporating a circuit housing is also disclosed to enable attachments of mobile payment device and barcode scanning devices. In embodiments, the protective case includes a flexible (e.g., rubberized) primary housing partially surrounded or enclosed by a rigid secondary housing, the secondary housing including port protectors for concealing or shielding connector ports (e.g., USB, HDMI, AC outlets) of the mobile device. The circuit housing is mounted to the rear face of the secondary housing (e.g., opposite the display surface of the mobile device) and provides a mount for a peripheral device to be used in conjunction with the mobile device. The circuit housing includes buttons operable from the rear face of the secondary housing, the buttons programmable to execute specific functions or applications of the mobile device or its associated peripherals, e.g., a scanning or imaging device incorporated into the circuit housing.

In some embodiments, the protective case includes a type cover adapter attached to the rigid secondary housing. For example, the type cover adapter engages with a partially flexible type cover which covers and protects the mobile device when closed and, when opened, includes a modular keyboard for providing control input to the mobile device via a connector port.

In some embodiments, the peripheral device is a barcode scanner wirelessly linked to the mobile device.

In some embodiments, the protective case includes a strap having a padded portion and attached to the rear face of the rigid housing at several points (e.g., at or near the corners of the housing). For example, the strap may accommodate a hand (e.g., the user's left or right hand) between the padded portion and the rigid housing, such that the user may support the mobile device via the hand and/or operate the rear-mounted buttons of the circuit housing via the fingers of the hand.

In some embodiments, the protective case includes a mobile terminal device (MTD) housing attached to an edge of the rigid housing and capable of rotation relative to the edge (e.g., via a hinge). For example, the housing is capable of accepting an MTD wirelessly linked to the mobile device, which MTS may be rotated out of the way when not in use (or, e.g., toward a customer for insertion of a payment card).

In some embodiments, the port protector is hinged to open and close. For example, when closed the port protector protects and conceals the connector port. When open, the port protector can assist in securing to the connector port an external connector carriage. For example, the external connector carriage may be at the terminal end of a cable connecting the mobile device to a remote device (e.g., peripheral device or terminal).

In some embodiments, the port protector includes a tray for accommodating the external connector carriage and one or more magnets for securing the external connector carriage to the connector port.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
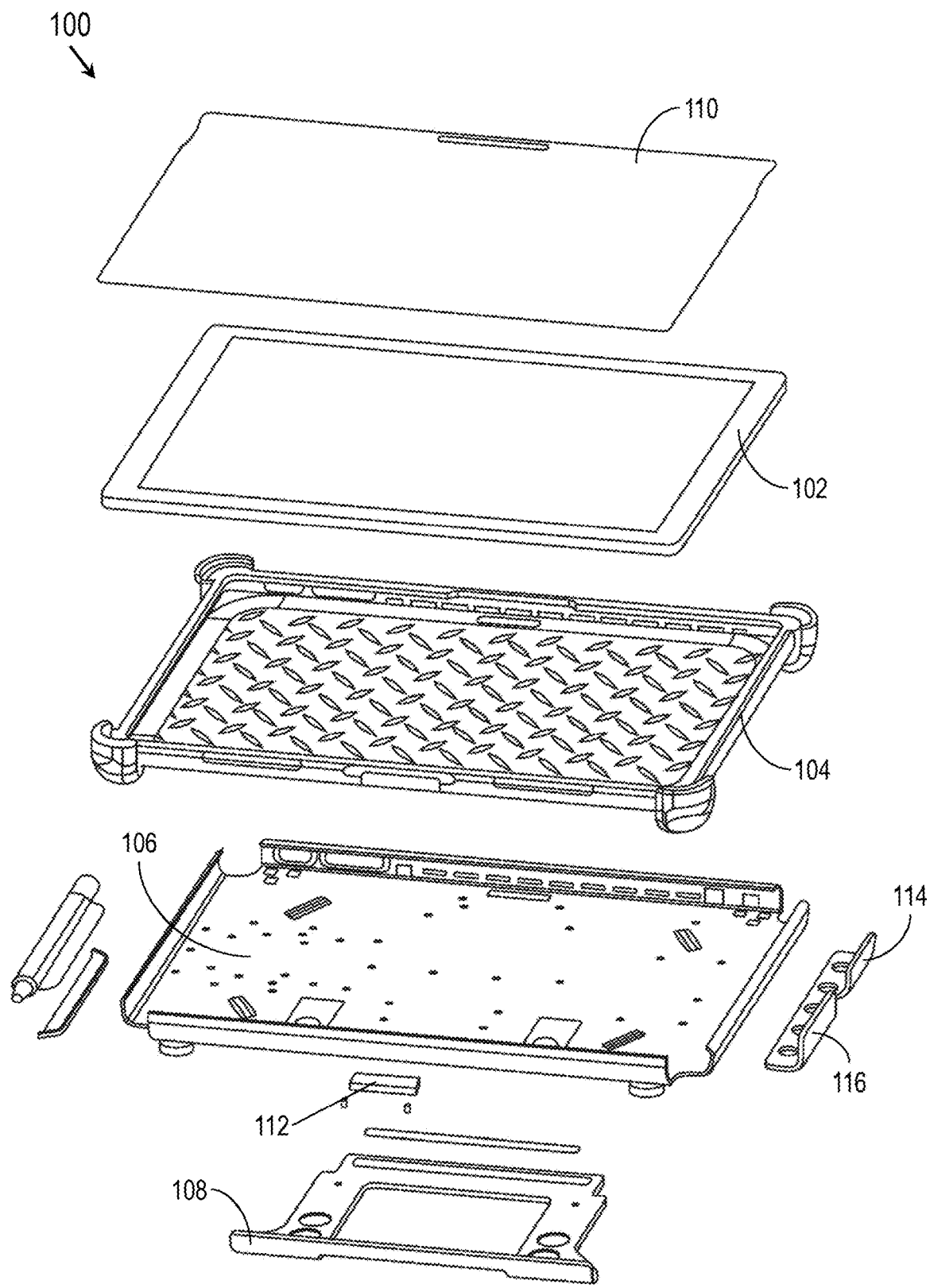
FIG. 1 is an exploded view illustrating a modular ruggedized protective case in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Referring to FIG. 1, a modular ruggedized protective case 100 for a mobile device 102 (e.g., a mobile communication or computing device incorporating processors; a tablet or phablet) is disclosed. In embodiments, the protective case 100 may include a primary housing 104, a secondary housing 106, a kickstand 108, a screen protector 110, a type cover keyboard (not shown . . . should add, it's 110 in FIG. 3, different than the screen protector labeled 110 in FIG. 1), and a type cover adapter 112.

In embodiments, the primary housing 104 may be fashioned of a flexible material, e.g., a rubber or rubberized material having a Shore durometer rating between A50 and A80, or more particularly Shore A60 silicone rubber. The primary housing 104 and case housing 106 may substantially enclose the exterior edges and rear face of the mobile device 102, excepting openings or apertures sized and positioned to provide access to connector ports (e.g., USB, HDMI, serial, parallel, Thunderbolt, Surflink, AC connection ports). The primary housing 104 may include port protectors 114, 116, e.g., repositionable flaps or tabs covering the connector ports but repositionable for the connection of a cable, cord, or portable storage device to the connector ports.

In embodiments, the secondary housing 106 may partially enclose the primary housing 104. The secondary housing 106 may be fashioned of a molded rigid high impact material, e.g., molded polycarbonate, acrylonitrile butadiene styrene (ABS), or an ABS/polycarbonate alloy.

Figure 2:
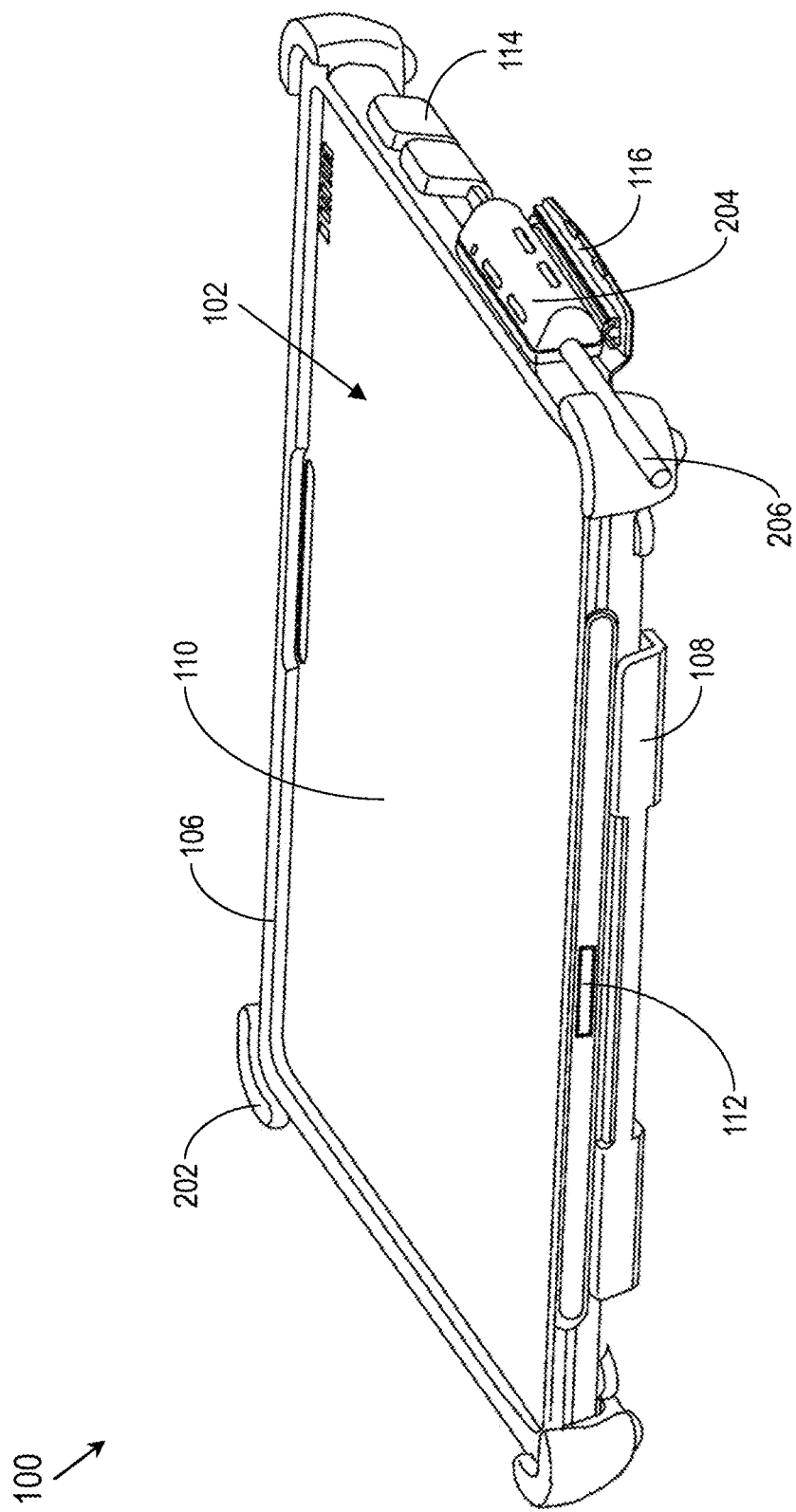
FIG. 2 is an overhead perspective view illustrating the modular ruggedized protective case of FIG. 1.

Referring to FIG. 2, the modular ruggedized protective case 100 is disclosed. In embodiments, the primary housing 104 may include reinforced corners 202 providing additional shock absorption for the corners and entirety of the mobile device 102. The port protectors 114, 116 may be repositionable to accommodate and secure an external connector carriage 204 to the protective case. The external connector carriage 204 may incorporate one or more power or data connectors (or both) compatible with connector ports of the mobile device (102, FIG. 1). For example, the external connector carriage 204 may supply the mobile device 102 with power or connect the mobile device to another device via a connector cable 206.

Figure 3A:
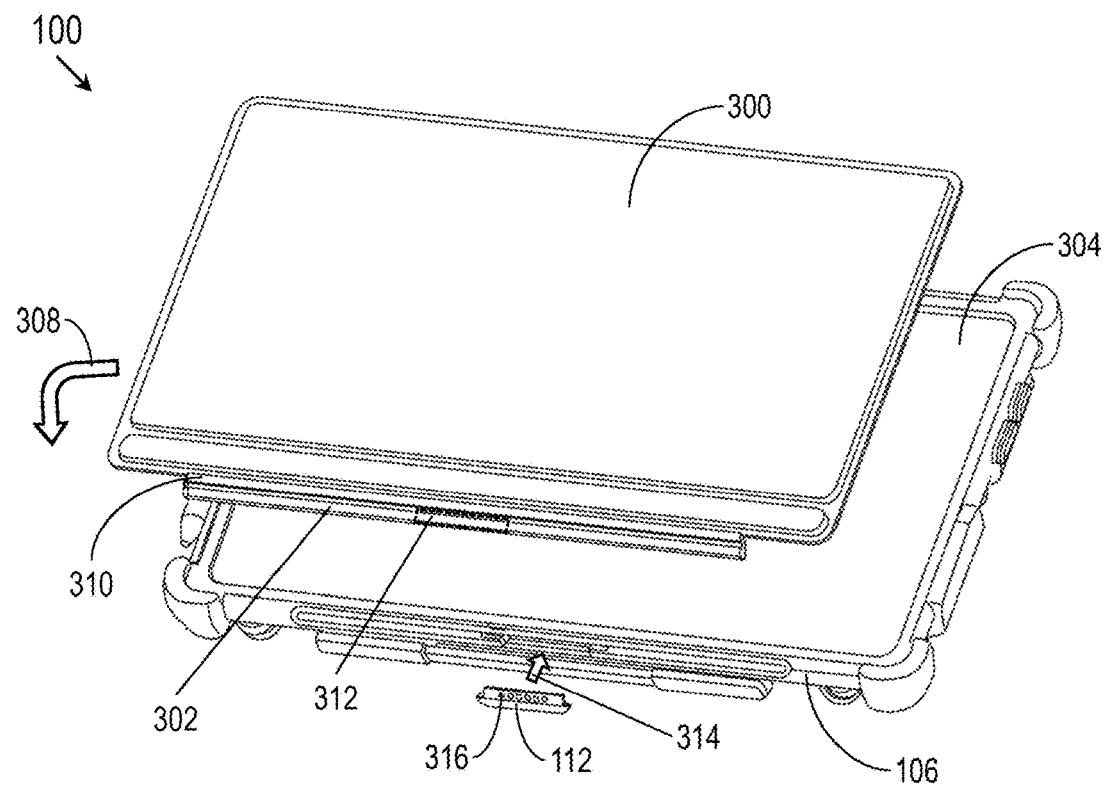
FIG. 3A is a partially exploded view illustrating a type cover keyboard and adapter of the modular ruggedized protective case of FIG. 1.
Figure 3B:
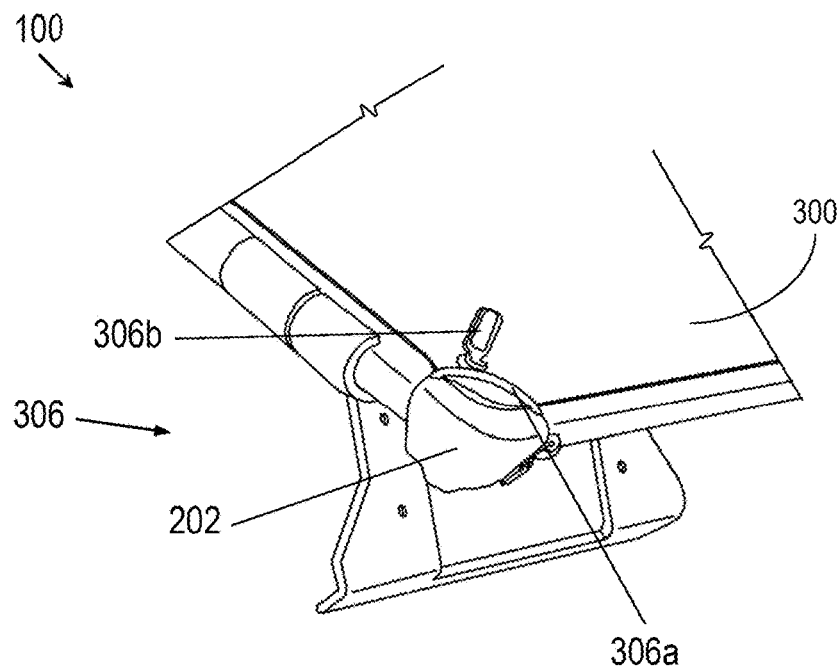
FIG. 3B is a detailed isometric view of a secured corner of the modular ruggedized protective case of FIG. 3A.

Referring to FIGS. 3A and 3B, the modular ruggedized protective case 100 is disclosed. In embodiments, the type cover keyboard 110 may removably attach to the mobile device (102, FIG. 1) via a magnetic strip 302 (e.g., series of magnets) extending along a long edge of the type cover keyboard 110, the magnetic strip aligned with, and attractable to, complementary magnets inside the secondary housing 106. The type cover keyboard 110 may substantially cover a display surface 304 (e.g., touchscreen) of the mobile device 102 when in a closed orientation. Referring in particular to FIG. 3B, the modular ruggedized protective case 100 may include corner loops 306 for holding the type cover keyboard 110 in place. For example, the corner loops 306 may include spring-loaded cables 306a extendable around the reinforced corners 202 of the type cover keyboard 110 via corner tabs 306b. From this closed orientation, the type cover keyboard 110 may be deployed, rotating (308) around a lengthwise crease or joint 310 between the magnetic strip 302 and the type cover to reveal a keypad on its internal surface, e.g., the surface facing the display surface 304 of the mobile device 102 when in the closed orientation.

In embodiments, the type cover keyboard 110 may incorporate type cover connectors 312 on the internal surface of the magnetic strip 302. For example, the type cover connectors 312 connect to a set of contacts (not shown) on the exterior edge of the mobile device 102, and through this connection enable control input submitted by a user via the keypad of the type cover 110 to reach the mobile device 102 for processing. However, the secondary housing 106 may impede the type cover connectors 312 and contacts of the mobile device 102 from connecting. The type cover adapter 112 may attach (314) to the secondary housing 106 and incorporate adapter contacts 316 which connect to the mobile device contacts through the type cover adapter and make external contact with the type cover connectors 312, allowing full functionality of the type cover keyboard 110 when the mobile device 102 is protected by the modular ruggedized protective case 100. In some embodiments, the modular ruggedized protective case 100 may fully integrate the type cover adapter 112 into the case housing (e.g., into the secondary housing 106) rather than via an attachable adapter.

Figure 4A:
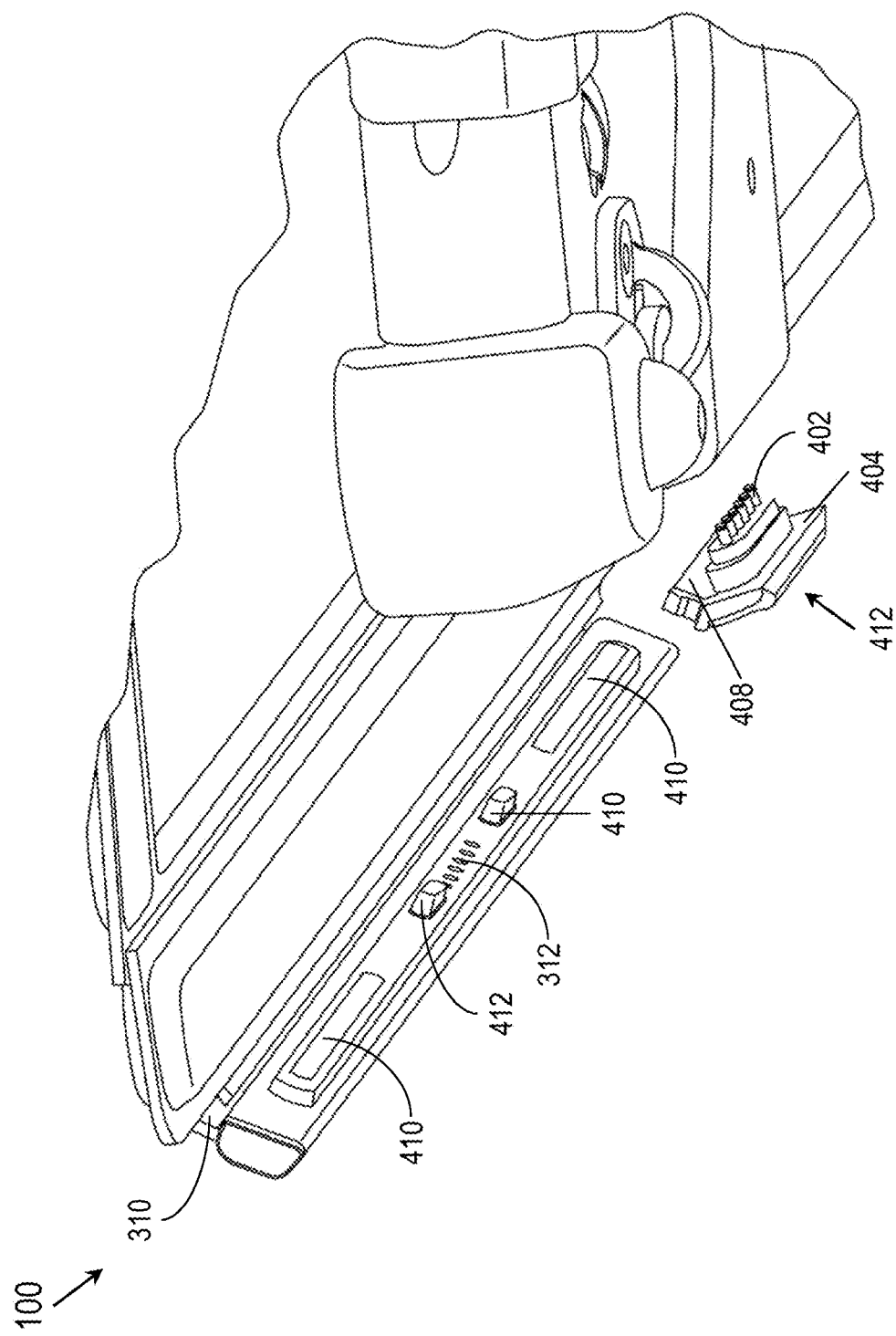
FIG. 4A is an underside partially exploded view illustrating the modular ruggedized protective case and type cover adapter of FIG. 1.
Figure 4B:
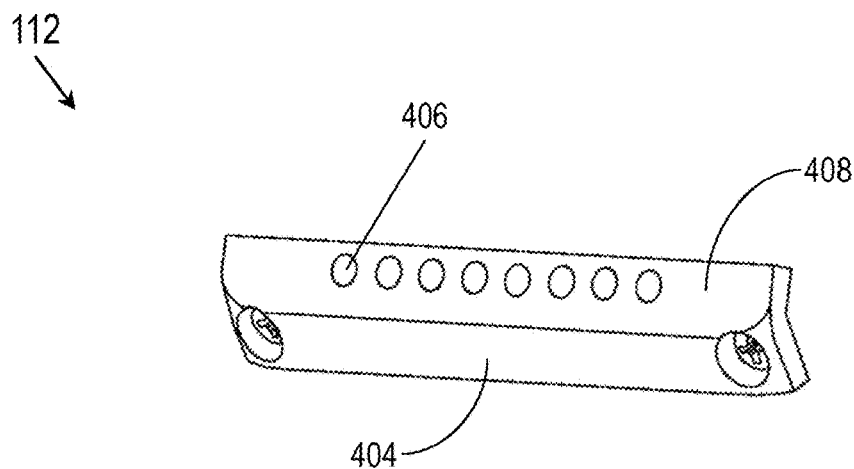
FIGS. 4B and 4C are detail views of the type cover adapter of FIG. 1.
Figure 4C:
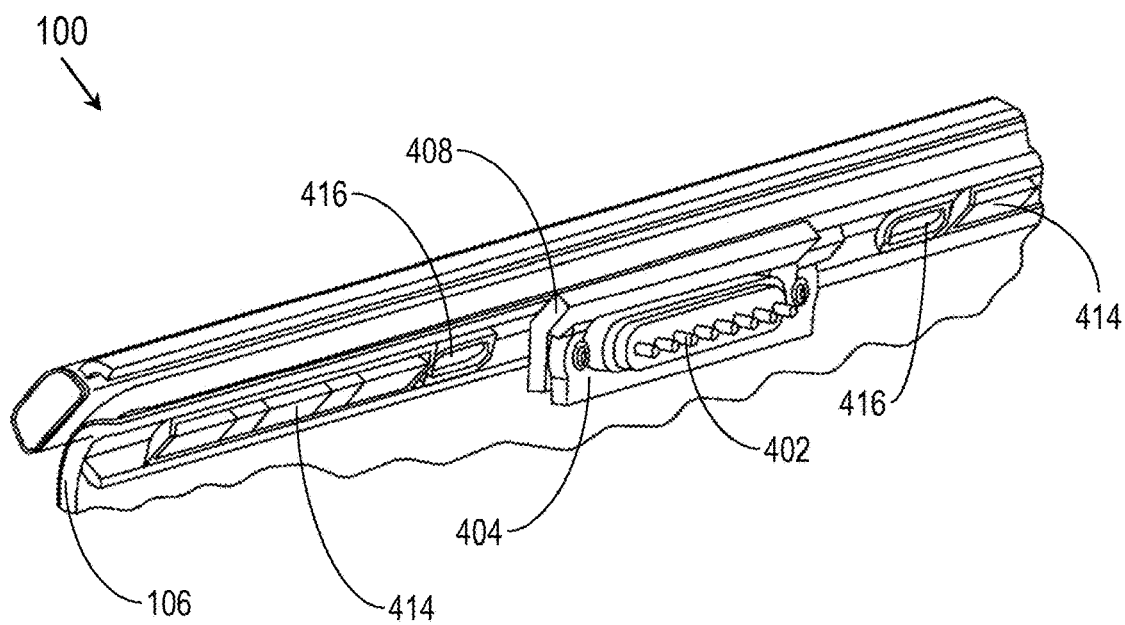

Referring to FIGS. 4A through 4C, the modular ruggedized protective case 100 and the type cover adapter 112 are disclosed. In embodiments, the type cover adapter 112 may be screwed, bolted, or otherwise fastened to the exterior of the protective case (e.g., to the secondary housing (106, FIG. 3)) such that the contact pins 402 set into the lower portion 404 of the type cover adapter may be set into the contact slots (not shown) of the mobile device (102, FIG. 1) wherein the type cover connectors 312 would normally fit to preserve a connection between the type cover keyboard (110, FIG. 3A) and the mobile device 102. The contact pins 402 may in turn be connected through the body of the type cover adapter 112 to auxiliary connectors 406 (e.g., auxiliary pins) set into the upper portion 408 of the type cover adapter. For example, when the type cover keyboard 110 is attached to the protective case 100 and the mobile device 102 enclosed therein, type cover magnets 410 and type cover tabs 412 may respectively complement case magnets 414 (e.g., with attracting polarity which may be alternating) and tab recesses 416 to secure the type cover to the protective case while allowing the type cover to be deployed (e.g., unfolded) along the joint 310. The auxiliary connectors 406 may then be held in contact with the type cover connectors 312, preserving the communicative connection between the type cover 110 and the mobile device 102 through the protective case 100.

Figure 5A:
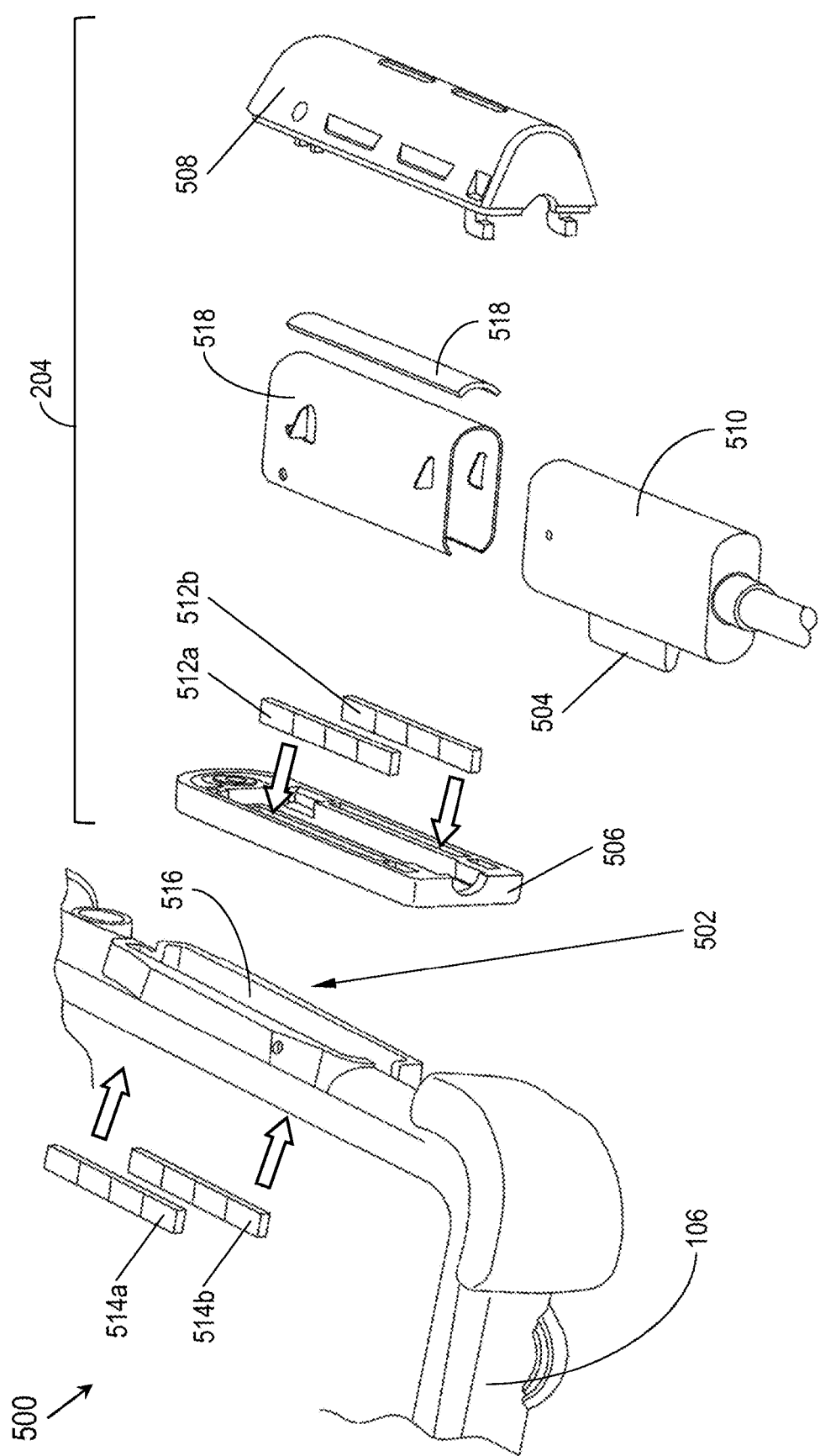
FIGS. 5A and 5B are partially exploded views illustrating a magnetic connector carriage module of the modular ruggedized protective case of FIG. 1.
Figure 5B:
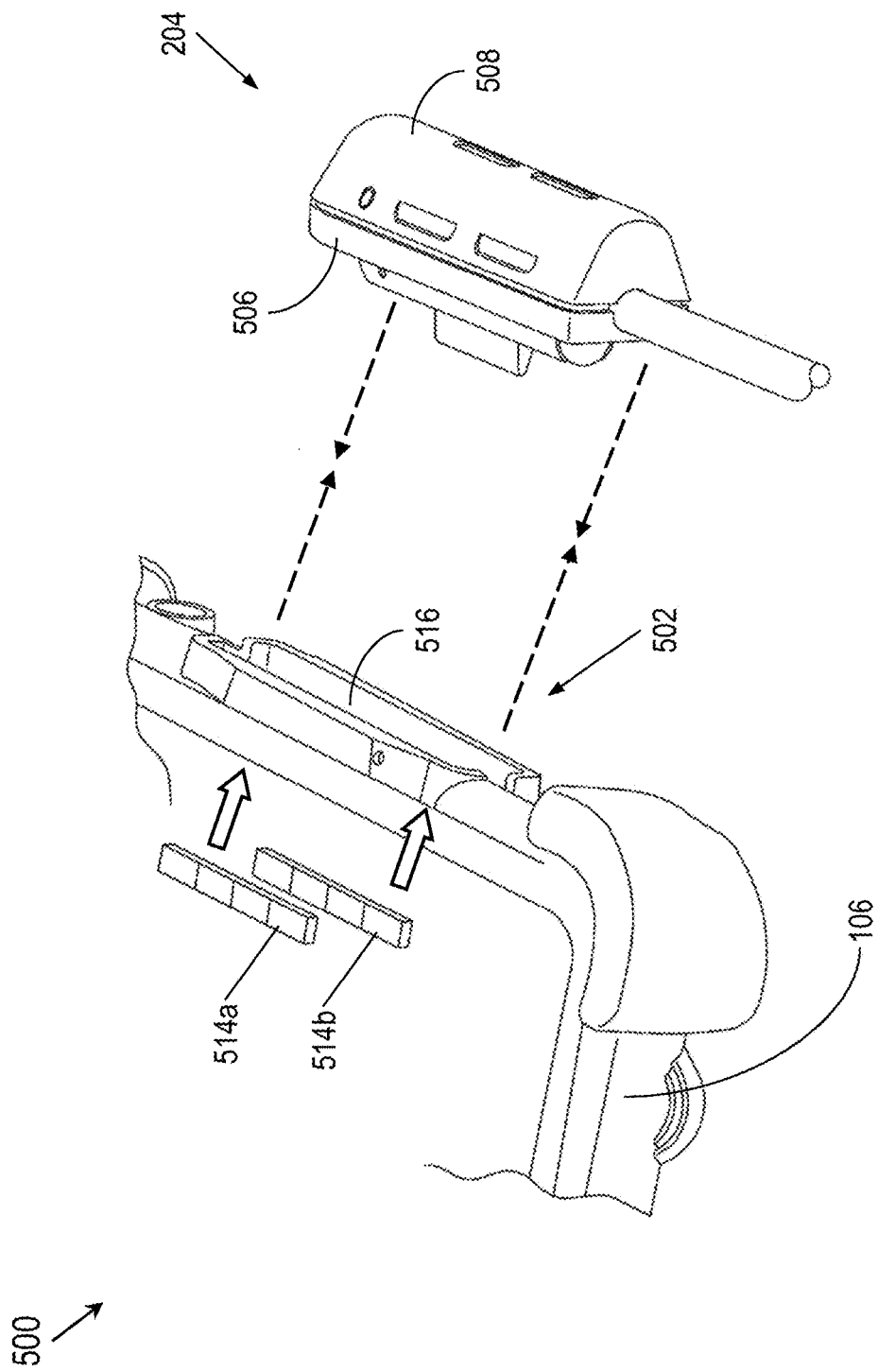

Referring to FIGS. 5A and 5B, a magnetic connector carriage module 500 of the modular ruggedized protective case 100 (FIGS. 1-4B) is shown. In embodiments, the port cover protector (116, FIG. 2) may fold or rotate downward (e.g., via a hinge or crease) to provide access to the connector port 502 compatible with a connector interface 504 of the external connector carriage 204. The external connector carriage 204 may comprise a lower housing 506 and an upper housing 508 couplable with each other (e.g., snappable, slidable, screwable). The connector interface 504 may include any appropriate type of data or power connector compatible with a connector port of the mobile device (102, FIG. 1), e.g., Surflink, USB, USB-C, HDMI, Thunderbolt, and other types of serial or parallel connector. While conventional external cable connectors may incorporate embedded magnets to attract complementary device magnets (e.g., in the mobile device near the connector), the magnetic connector carriage module 500 may strengthen the connection of the external connector carriage 204 (e.g., via standard magnets embedded in the original device connector (510)) by incorporating complementary sets of magnets 512a-b, 514a-b into, respectively, the external connector carriage 204 and the open slot 516 of the secondary housing 106 (e.g., surrounding the connector port 502 respectively above and below where the connector interface 504 connects to the connector port).

For example, the set of magnets 512a-b may be aligned, with varying and alternating polarity, and inserted into the top and bottom respectively of the lower housing 506 of the connector module carriage 204. The magnets 512a-b may be attracted to the complementary magnets 514a-b embedded in the corresponding top and bottom of the open slot 516 of the modular ruggedized protective case 100 (e.g., of the secondary housing 106), allowing access to the connector port 502 of the mobile device 102.

In embodiments, the attraction of the magnets 512a-b (e.g., set into the lower housing 506 of the external connector carriage 204) to the magnets 514a-b (e.g., embedded on either side of the open slot 516) may draw the external connector carriage 204 toward the secondary housing 106 and in particular toward the open slot 516 and the connector port 502, holding the external connector carriage in alignment with the connector port. In some embodiments, the connector interface 504 may be further bracketed and shielded (518), e.g., to protect a data connection via the connector interface 504 from the magnets 512a-b and other wireless interference within the external housing 508 (and the complementary magnets 514a-b set into the secondary housing 106 adjacent to the open slot 516).

Figure 6:
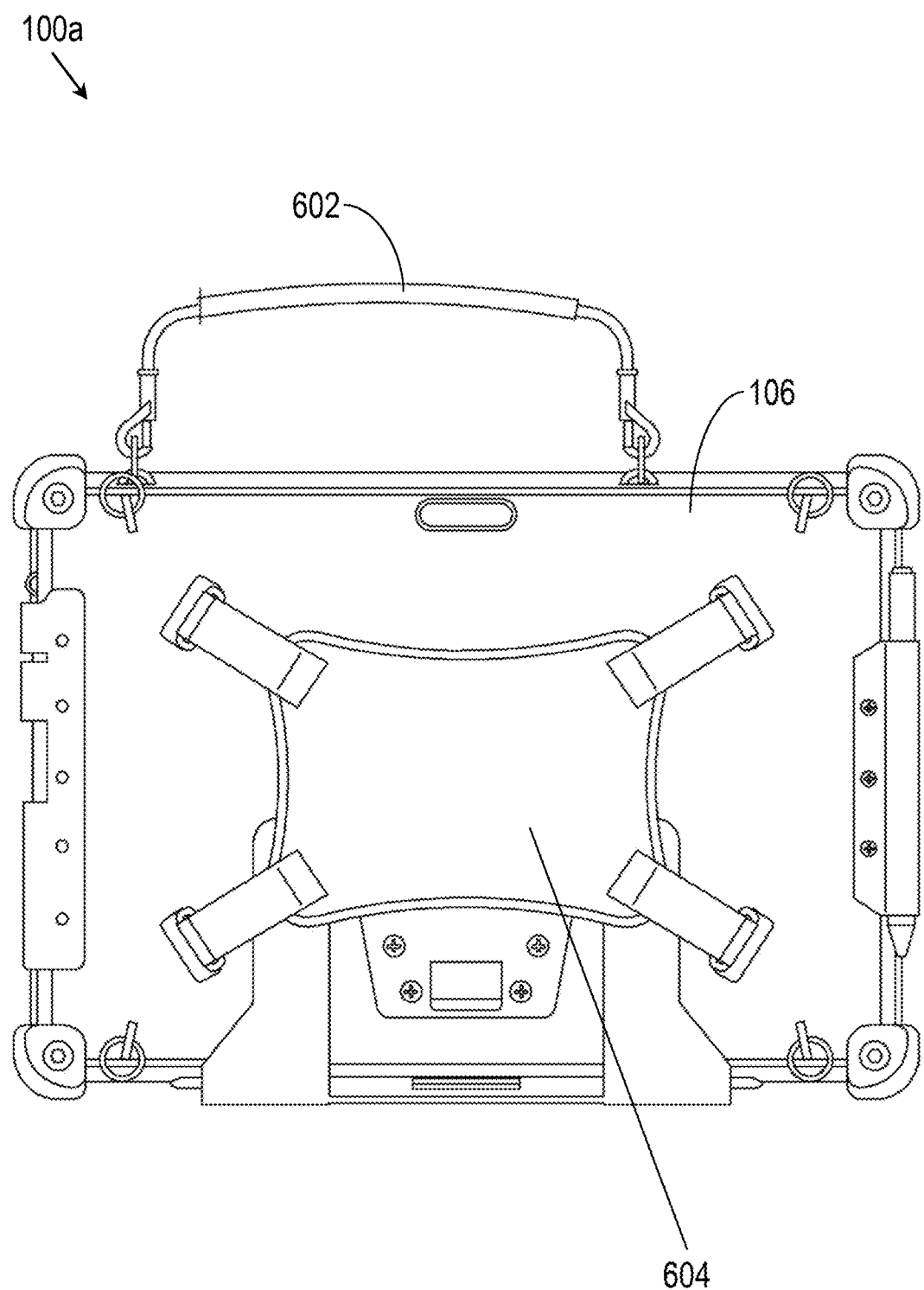
FIG. 6 is a rear view illustrating the modular ruggedized protective case of FIG. 1.

Referring to FIG. 6, the modular ruggedized protective case 100a is shown. In embodiments, the modular ruggedized protective case 100a may be implemented and may function similarly to the modular ruggedized protective case 100 of FIGS. 1 through 5B, except that the modular ruggedized protective case 100a may incorporate a carrying handle 602 and/or strap 604 attached to the secondary housing 106 of the protective case. For example, the carrying handle 602 may provide a means of transporting the modular ruggedized protective case 100a (and the mobile device (102, FIG. 1) enclosed therein) when not in use. Similarly, the strap 604 may allow a user or operator of the mobile device 102 to secure the mobile device in one hand (e.g., like a glove wrapping around the hand) while operating the mobile device (and/or its peripheral devices and applications) with the other hand, e.g., via the touch-sensitive display surface (304, FIG. 3).

Figure 7A:
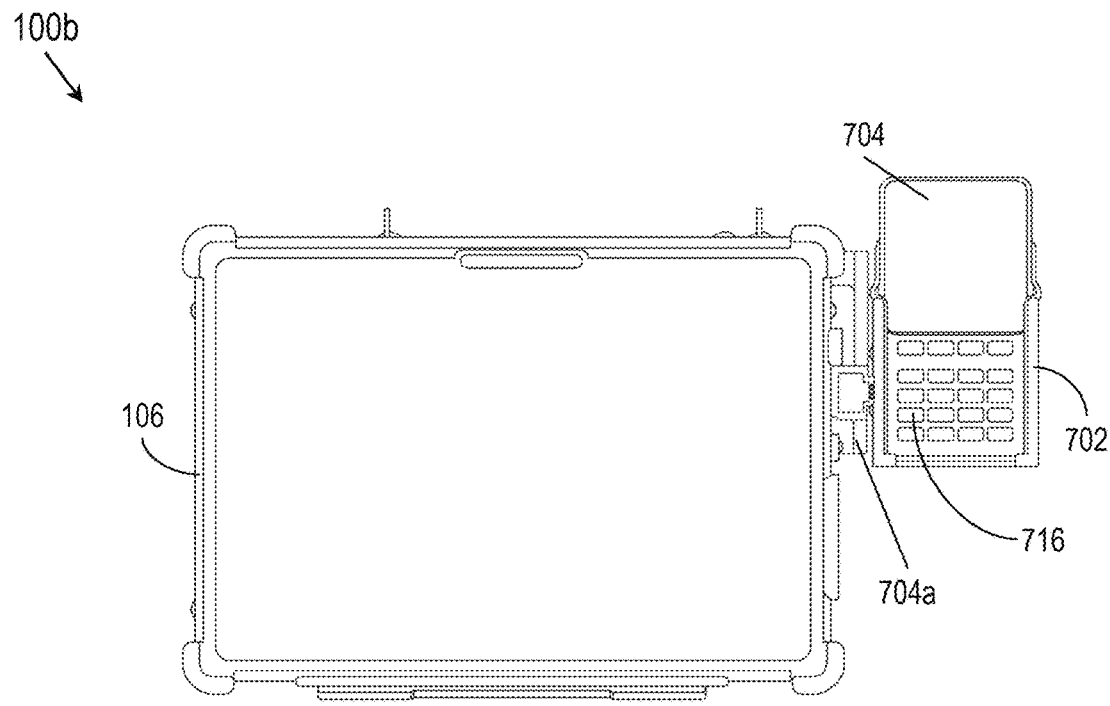
FIG. 7A is a forward view illustrating a modular ruggedized protective case and peripheral device housing in accordance with example embodiments of this disclosure.
Figure 7B:
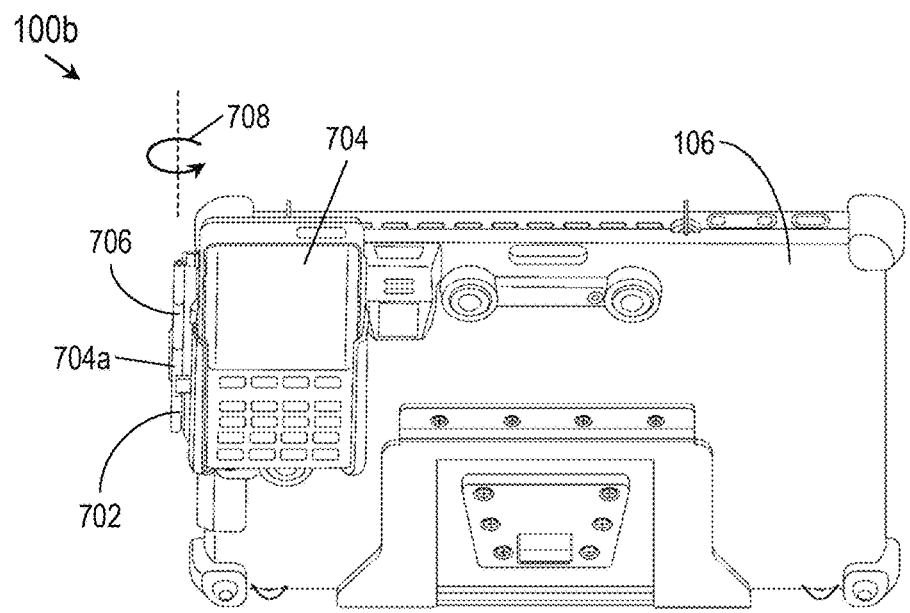
FIG. 7B is a rear isometric view illustrating the modular ruggedized protective case and peripheral device housing of FIG. 7A.

Referring to FIGS. 7A through 7F, a modular ruggedized protective case 100b is disclosed. The modular ruggedized protective case 100b may be implemented and may function similarly to the modular ruggedized protective cases 100, 100a of FIGS. 1 through 6, except that the modular ruggedized protective case 100b may incorporate a peripheral device housing 702 attached to its exterior (e.g., to either side of the secondary housing 106) and capable of securely holding (e.g., with a latch and locking mechanism) a mobile payment terminal device 704 (MTD; e.g., mobile data terminal) for use in conjunction with the mobile communications device 102. The MTD 704 may be securely held by, but removable from, the peripheral device housing 702. For example, the peripheral device housing 702 may be attached to the right side of the protective case 100b, such that the protective case and the mobile device 102 may be secured in the left hand (e.g., via the strap 604, FIG. 6) while the MTD 704 is operated by the right hand. Referring in particular to FIG. 7B, the peripheral device housing bracket 704a may be hinged (706) to allow the MTD 704 in the peripheral device housing 702 to be rotated (708) in the housing away from the display surface 304 of the mobile device 102, e.g., when not in use, or to allow the customer to shield a PIN number entry from the mobile device operator.

Figure 7C:
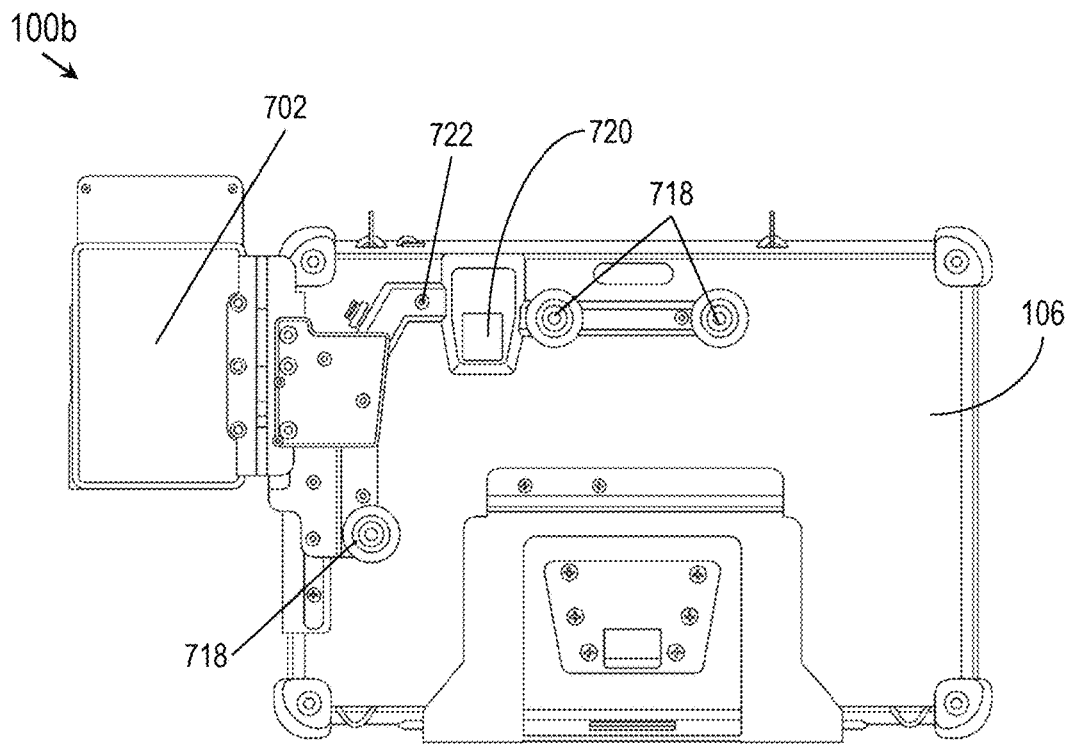
FIG. 7C is a rear view illustrating the modular ruggedized protective case and peripheral device housing of FIG. 7A.
Figure 7D:
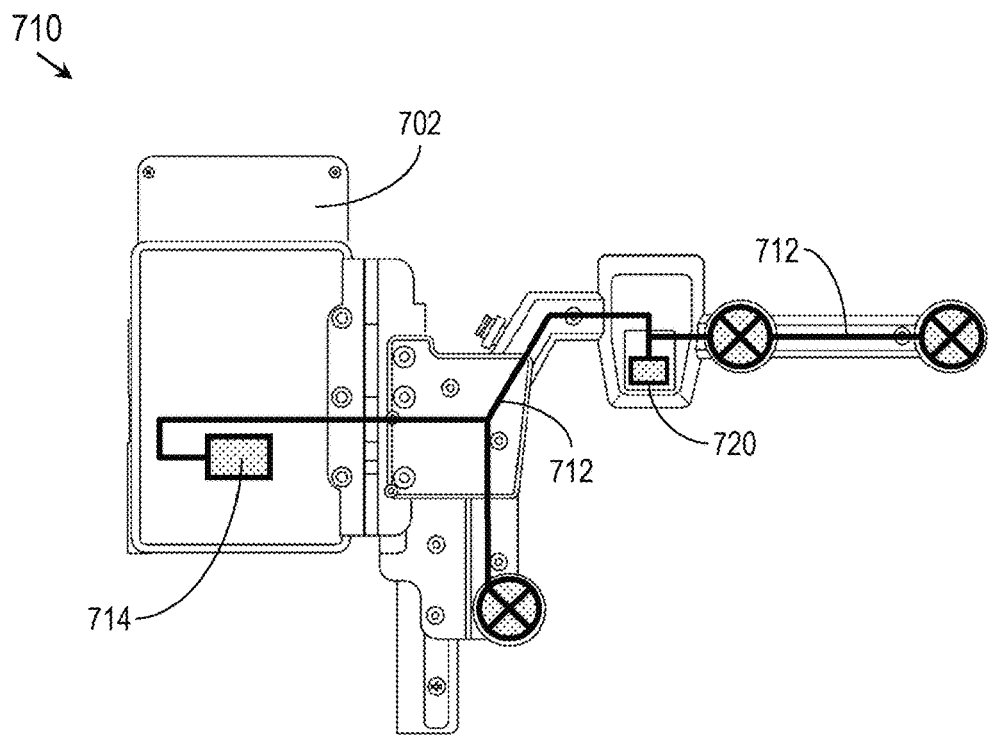
FIG. 7D is a diagrammatic detail view illustrating the peripheral device housing of FIG. 7A.
Figure 7E:
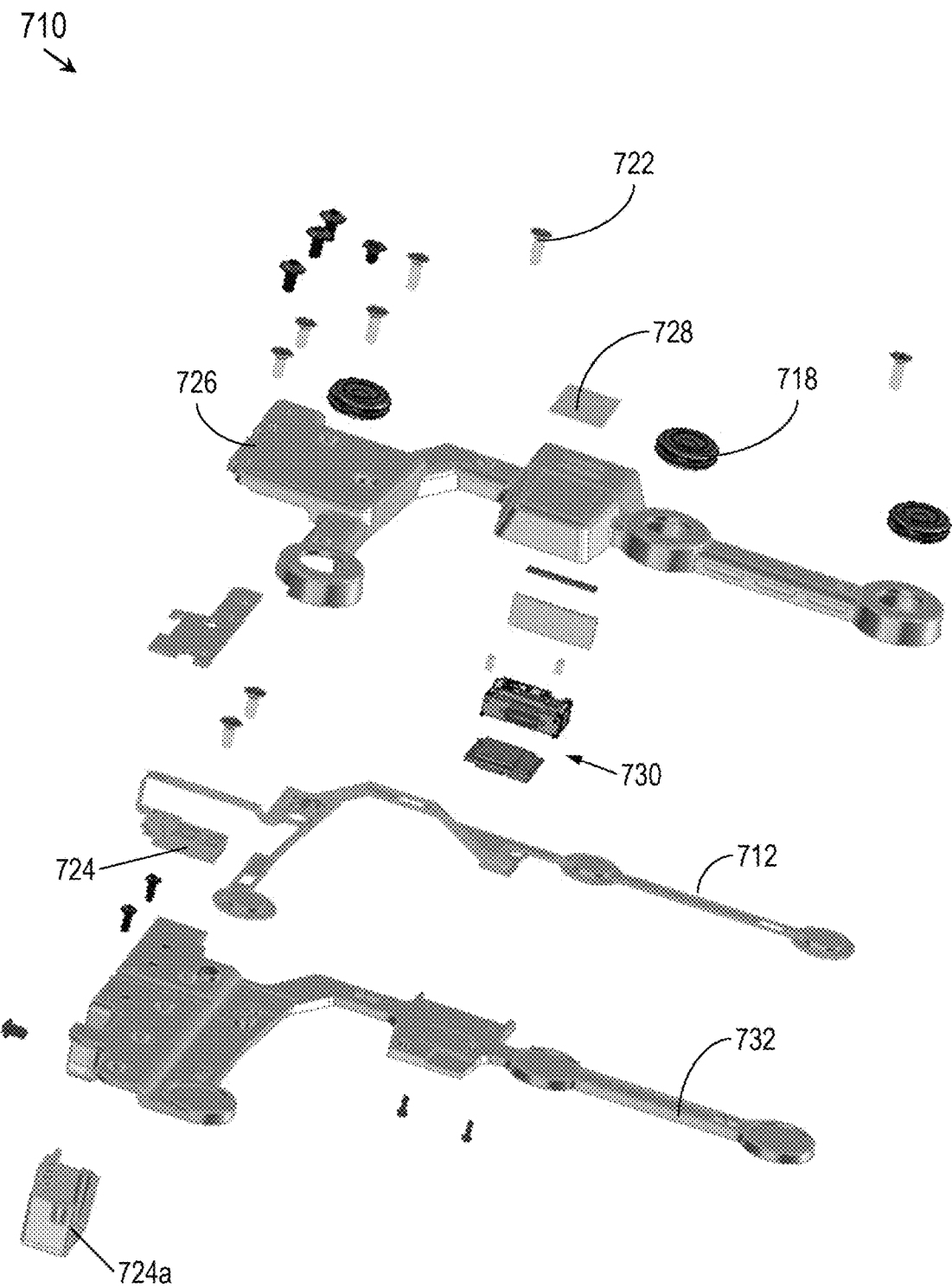
FIG. 7E is an exploded view of a circuit housing of the modular ruggedized protective case of FIG. 7A.

Referring in particular to FIGS. 7C through 7E, the modular ruggedized protective case 100b may incorporate a circuit housing 710 mounted to the rear face of the secondary housing 106. In embodiments, the circuit housing 710 may securely enclose physical connections (e.g., via a flexible cable 712 or circuit assembly) between an MTD interface (714) within the peripheral device housing 702 and the mobile device 102, such that a user supporting the protective case 100b in either hand (e.g., via the strap 604) may operate the MTD 704 with the right hand through its keypad 716 or, alternatively, program particular functions of the MTD to trigger or execute when programmable external buttons 718 in the circuit housing 710 are pressed with the hand supporting the protective case. In some embodiments, the circuit housing 710 may further incorporate a barcode scanning module 720 or other rear-facing peripheral devices.

Referring in particular to FIG. 7E, the circuit housing 710 may be attached to the rear face of the secondary housing 106 by a series of screws (722) into inserts in the secondary housing 106. In some embodiments, the barcode scanning module 720 may be separate and distinct from the circuit housing 106 but may attach flush thereto. The circuit housing 710 may interface with the mobile device 102 (FIG. 1) via a standard communication port (e.g., a USB port, or communication port accessible behind a port protector (114, FIG. 1). For example, the barcode scanning module 720 may interface with the communication port via the circuit housing 710 and the flexible cable 712 and cable connector 724 secured at a right angle within the external housing 726 of the barcode scanning module, such that the flexible cable is protected (724a) yet remains compact. In embodiments, the external housing 726 of the circuit housing 710 may include one or more assemblies connected by the flexible cable 712, e.g., the barcode scanner module 720 and MTD 704. For example, the external housing 726 may include a lens window 728 for transparent protection of the emitters and sensors (730) of the barcode scanner module 720.

In embodiments, the circuit housing may include a substantially flat base 732 that affixes flush to the secondary housing 106 and to the flexible cable 712 for the interface rests. The external housing 726 may then attach over the flexible cable 712 and base 732. In embodiments, initiation of barcode scanning operations may be achieved via a switching mechanism activated by the programmable external buttons 718 capable of communicating control input to the barcode scanner 720. For example, the external buttons 718 may be hard plastic or rubber coated, with tactile shapes and features (e.g., dimples) allowing the operator to blindly find or identify the center of a particular button 718 while holding the mobile device 102 within the modular ruggedized protective case 100b (see, e.g., FIG. 6 and accompanying text above). The external buttons 718 may be placed so as to be able to trigger the barcode scanner 720 when activated by fingers of either the left or right hand while holding the mobile device 102 with that hand, or while fingers from that hand inserted into the glove fitting hand strap (604, FIG. 6). In some embodiments, barcode scanner operations may also be triggered by audible prompt (e.g., voice recognition) or via software button on the display surface (304, FIG. 3) of the mobile device 102. In some embodiments, the circuit housing 710 may incorporate several layers of component secured by a single screw or fastener, whereby a plastic base 732, flexible cable 712 or circuit assembly, scanner optics and decoder (730), and plastic external housing (726; including the lens window 728) are attachable to the secondary housing 106 (e.g., via screws into a particular set of screw holes in the rear face of the secondary housing).

Figure 7F:
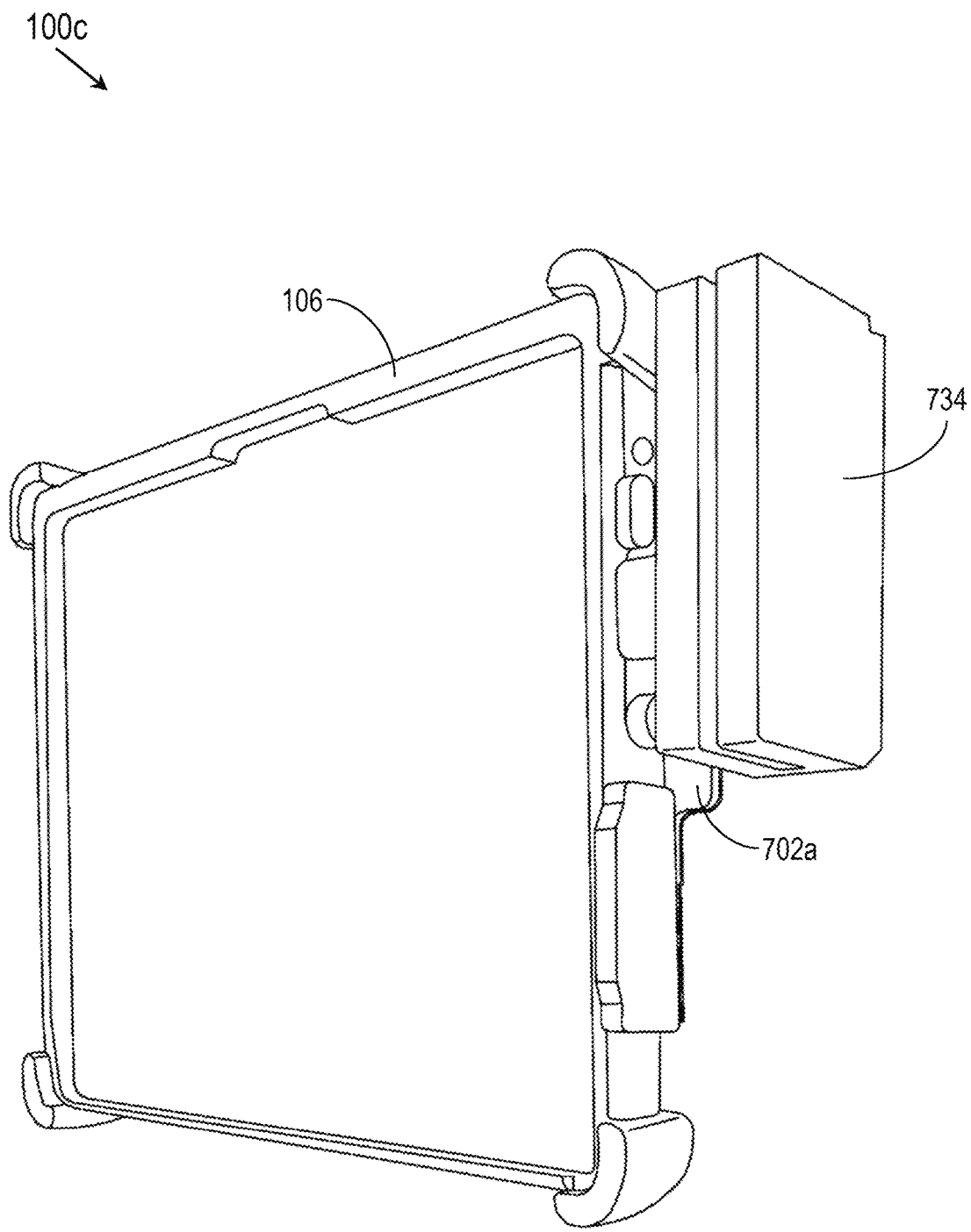
FIG. 7F is a right-side isometric view illustrating a modular ruggedized protective case and peripheral device housing in accordance with example embodiments of this disclosure.

Referring in particular to FIG. 7F, a modular ruggedized protective case 100c and peripheral device housing 702a are disclosed. The modular ruggedized protective case 100c and peripheral device housing 702a may be implemented and may function similarly to the modular ruggedized protective case 100b and peripheral device housing 702 of FIGS. 7A-E, except that the screw holes peripheral device housing 702a may incorporate other types of mobile data terminal devices in addition to the MTD 704. For example, in embodiments, the peripheral device housing 702a may accommodate a card reader 734 (e.g., magnetic strip reader) for reading and collecting data from cards equipped with magnetic strips or chips.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A modular ruggedized protective case for a mobile communications device, comprising:
   a primary housing configured to at least partially enclose one or more of an edge of a mobile communications device and a rear face of the mobile communications device, the primary housing fashioned of a flexible material, wherein the mobile communications device is a tablet device;
   a secondary housing configured to at least partially enclose the primary housing, the secondary housing fashioned of a rigid material and including at least one port protector capable of concealing at least one first connector port of the mobile communications device; and
   at least one circuit housing attached to a rear face of the secondary housing, the circuit housing comprising:
      at least one peripheral device disposed within the circuit housing, the at least one peripheral device communicatively coupled with the mobile communications device and including at least one scanner; and one or more buttons set into the at least one circuit housing and extending rearward from the rear face of the secondary housing, the one or more buttons electronically coupled to the peripheral device and configured to activate the peripheral device, the mobile communications device configured to be supported by a hand and each of the one or more buttons configured to be operable by a finger of the hand.

2. The modular ruggedized protective case of claim 1, further comprising:

at least one type cover adapter attached to the secondary housing and configured to engage with:
1) a type cover configured to provide control input to the mobile communications device when in an open state and to at least partially cover the mobile communications device when in a closed state; and
2) a second connector port of the mobile communications device;
the type cover adapter configured to transmit the control input to the mobile communications device via the second connector port.

3. The modular ruggedized protective case of claim 1, wherein:

the at least one peripheral device is communicatively coupled to the mobile communications device via at least one wireless link.

4. The modular ruggedized protective case of claim 1, further comprising:

a strap comprising a padded portion attached to the rear face of the secondary housing at a plurality of points, the strap configured to accommodate the hand between the padded portion and the secondary housing, the hand capable of supporting the mobile communications device; and each of the one or more buttons operable by a finger of the hand.

5. The modular ruggedized protective case of claim 1, further comprising:

a device housing hingedly attached to the circuit housing proximate to an edge of the secondary housing, the device housing configured for rotation around a rotational axis parallel to the edge, the device housing configured to accommodate a mobile terminal device wirelessly coupled to the mobile communications device.

6. The modular ruggedized protective case of claim 1, wherein:

the port protector is hingedly operable between an open state and a closed state;

the port protector is capable of concealing the connector port in the closed state; and the port protector is capable of partially securing to the connector port an external connector carriage connected by a cable to a remote device electronically couplable to the mobile communication device via the cable.

7. The modular ruggedized protective case of claim 1, wherein the port protector includes at least one of:

an inner panel configured to physically accommodate the external connector carriage; and a magnet configured to magnetically secure the external connector carriage to the connector port.

\* \* \* \* \*